(12) United States Patent
Kwan et al.

(10) Patent No.: US 7,455,724 B2
(45) Date of Patent: Nov. 25, 2008

(54) DECODER SYSTEM

(75) Inventors: Wing Sum Vincent Kwan, Chicago, IL (US); Leighton Davies-Smith, Oak Ridge, NC (US)

(73) Assignee: Sanford, L.P., Oak Brook, IL (US)

( * ) Notice: Subject to any disclaimer, the term of this patent is extended or adjusted under 35 U.S.C. 154(b) by 309 days.

(21) Appl. No.: 11/207,845

(22) Filed: Aug. 18, 2005

(65) Prior Publication Data

US 2007/0240607 A1   Oct. 18, 2007

Related U.S. Application Data

(60) Provisional application No. 60/602,785, filed on Aug. 19, 2004.

(51) Int. Cl.
  *C09D 11/00*   (2006.01)
(52) U.S. Cl. .................................................. 106/31.32
(58) Field of Classification Search ............... 106/31.32
  See application file for complete search history.

(56) References Cited

U.S. PATENT DOCUMENTS

| | | | |
|---|---|---|---|
| 4,097,290 A | 6/1978 | Muller et al. ................. | 106/30 |
| 4,227,930 A | 10/1980 | Lin ............................... | 106/19 |
| 4,252,845 A | 2/1981 | Griffiths et al. ............. | 427/273 |
| 4,441,928 A | 4/1984 | Iijima .......................... | 106/21 |
| 4,557,618 A | 12/1985 | Iwata et al. .................. | 401/34 |
| 5,071,440 A | 12/1991 | Hines et al. .................. | 8/403 |
| 5,196,243 A | 3/1993 | Kawashima ................. | 428/29 |
| 5,232,494 A | 8/1993 | Miller ......................... | 106/22 B |
| 5,326,388 A | 7/1994 | Miller et al. ................ | 106/22 B |
| 5,352,282 A | 10/1994 | Miller ......................... | 106/22 B |
| 5,478,382 A | 12/1995 | Miller et al. ................ | 106/22 B |
| 5,486,228 A | 1/1996 | Miller et al. ................ | 106/22 B |
| 5,489,331 A | 2/1996 | Miller et al. ................ | 106/22 B |
| 5,492,558 A | 2/1996 | Miller et al. ................ | 106/22 B |
| 5,498,282 A | 3/1996 | Miller et al. ................ | 106/22 B |
| 5,503,665 A | 4/1996 | Miller et al. ................ | 106/21 R |
| 5,549,742 A | 8/1996 | Cancellieri ................. | 106/22 B |
| 5,568,986 A | 10/1996 | Sugai .......................... | 400/695 |
| 5,684,069 A | 11/1997 | Auslander ................... | 524/88 |
| 5,916,357 A | 6/1999 | Wang et al. ................. | 106/31.23 |
| 5,922,115 A | 7/1999 | Sano et al. .................. | 106/31.32 |
| 6,017,386 A | 1/2000 | Sano et al. .................. | 106/31.32 |
| 6,149,719 A | 11/2000 | Houle ......................... | 106/31.14 |
| 6,203,603 B1 | 3/2001 | Takayama et al. .......... | 106/31.16 |
| 6,513,921 B1 | 2/2003 | Houle ......................... | 347/96 |
| 6,685,373 B1 | 2/2004 | Liu .............................. | 401/35 |
| 2003/0235654 A1 | 12/2003 | Puntambekar ............. | 427/378 |
| 2005/0150423 A1* | 7/2005 | Godbout ..................... | 106/31.32 |

FOREIGN PATENT DOCUMENTS

| | | |
|---|---|---|
| EP | 1 198 353 B1 | 2/2003 |
| WO | WO 00/61374 | 10/2000 |

OTHER PUBLICATIONS

International Search Report for International (PCT) Application No. PCT/US2005/029786, dated Dec. 8, 2005.
Written Opinion for International (PCT) Application No. PCT/US2005/029786, dated Dec. 8, 2005.

* cited by examiner

*Primary Examiner*—Jerry Lorengo
*Assistant Examiner*—Veronica Faison Gee
(74) *Attorney, Agent, or Firm*—Marshall, Gerstein & Borun LLP

(57) ABSTRACT

The disclosure is generally related to a decoder system and, more particularly, to a decoder system comprising a coding composition, a decoding composition and optionally, an erasing composition. The disclosure also provides decoder writing instrument systems comprising a coding writing point in fluid communication with a coding composition, a decoding writing point in fluid communication with a decoding composition and optionally, an erasing writing point in fluid communication with an erasing composition.

18 Claims, 2 Drawing Sheets

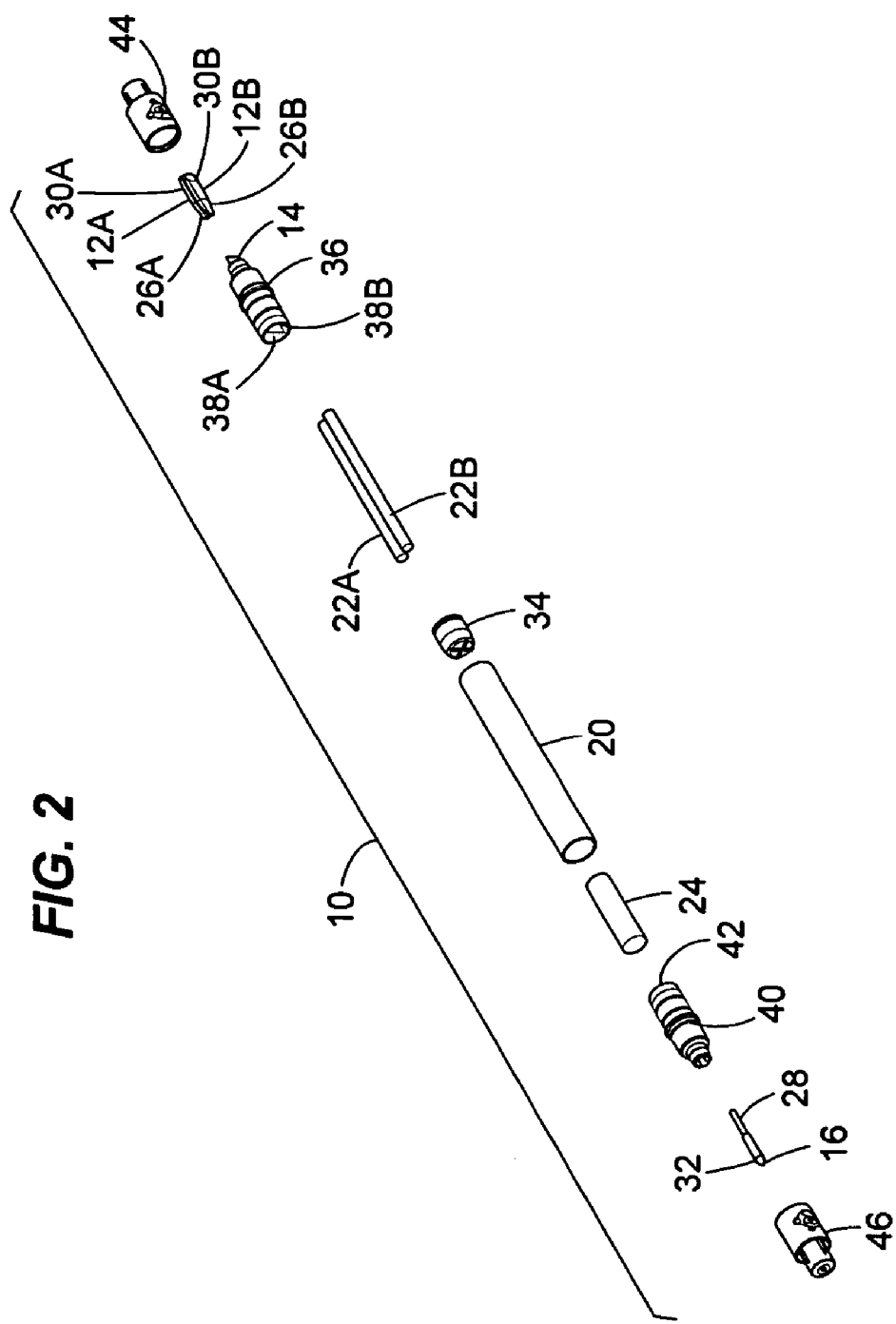

DECODER SYSTEM

CROSS-REFERENCE TO RELATED APPLICATION

The benefit under 35 U.S.C. §119(e) of U.S. provisional patent application Ser. No. 60/602,785 filed Aug. 19, 2004, the entire disclosure of which is incorporated herein by reference, is hereby claimed.

BACKGROUND OF THE DISCLOSURE

1. Field of the Disclosure

The disclosure is generally related to a decoder system and, more particularly, to a decoder system comprising a coding composition, a decoding composition and optionally, an erasing composition.

2. Brief Description of Related Technology

Traditionally, writing and printing apparatuses including but not limited to markers, pens, printers, typewriters, and stamps were simply used to make visual (and preferably, at least semi-permanent) records of information. More recently, however, some apparatuses have been used to "code" information, i.e., to make a record of "coded" information that is not readily visible to the eye. A sensor that generally knows where the information has been coded reveals or "decodes" the coded information by using a decoding tool. The decoding tool, which generally comprises physical or chemical means, typically causes a visible, positive image of the coded information to be formed.

For example, U.S. Pat. Nos. 5,684,069, 6,149,719, and 6,513,921 describe ink compositions capable of coding information such that the coded information is not readily visible to a non-target reader. Information recorded using such ink compositions is generally used to increase document security and/or to provide non-interfering bar coding for inventory control purposes. In each of the aforementioned patents, the coded information must be developed by ultraviolet or infra-red light in order to be further processed. Irradiation of the ink compositions that make up the coded information causes the ink compositions to emit and/or absorb light, thereby making a positive image of the coded information, which is detectable using various commercially available infra-red and/or ultra-violet spectrophotometric sensors.

BRIEF DESCRIPTION OF THE DRAWINGS

Exemplary aspects and features of a decoder system in accordance with the disclosure are described and explained in greater detail below with the aid of the drawing figures in which.

DETAILED DESCRIPTION

Figure 1:
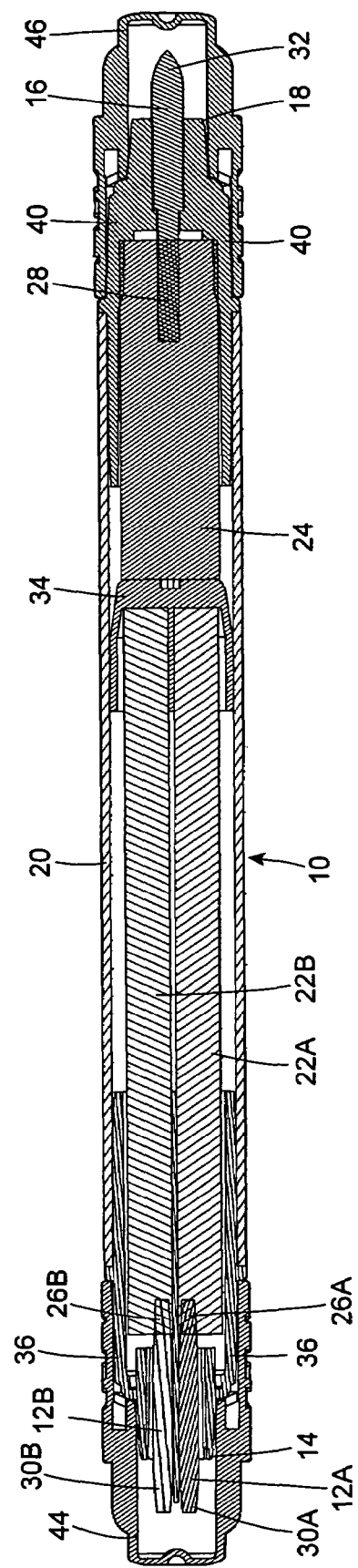
FIG. 1 is a cross-sectional view of an exemplary writing instrument incorporating the decoder system according to the disclosure; and, FIG. 2 is an exploded view of the writing instrument of FIG. 1.

One embodiment of the disclosure provides a decoder system comprising a coding composition, a decoding composition and optionally, an erasing composition.

After application to a substrate, the coding composition initially is visible, but becomes substantially colorless (or substantially invisible) after a certain period of time. Thus, the coding composition can be used to "code" information, i.e., to make a record of "coded" information that is not readily visible to the eye. The coding composition generally comprises a solvent system comprising a solvent and either a volatile acid or a volatile base, a color change dye that becomes substantially colorless upon evaporation of the solvent system, and a color-destroying agent. The color-destroying agent should be capable of making the decoding composition substantially colorless.

The decoding composition is used to reveal or "decode" the coded information. Because the coding composition that provides (and becomes) the coded information includes a color-destroying agent, the color of the decoding composition applied over and/or about the coded information quickly becomes substantially colorless. Therefore, a reverse image of the coded information is formed when the decoding composition is applied over and about the coded information. The decoding composition generally comprises a solvent and an eradicable dye that becomes substantially colorless after contacting the color-destroying agent of the coding composition, but which otherwise remains substantially colored.

The erasing composition can be used to permanently erase the coded information, if desired. The erasing composition generally comprises a solvent and a color-destroying agent. As in the coding composition, the color-destroying agent should be capable of making the decoding composition substantially colorless.

An additional embodiment of the disclosure provides a decoder writing instrument system comprising a coding writing point in fluid communication with a coding composition, a decoding writing point in fluid communication with a decoding composition and optionally, an erasing writing point in fluid communication with an erasing composition. Representative writing instruments for use in the decoder writing instrument systems include but are not limited to ball point pens, fountain pens, and markers.

When a user makes written marks with the coding writing point, the written marks become substantially colorless, thereby coding the information. Advantageously, the written marks made with the coding writing point are initially visible before becoming substantially colorless (i.e., becoming coded information). Consequently, the user is able to see the written marks for a period of time after they are made (prior to the written marks becoming substantially colorless, thereby forming coded information). This period of time lasts until the color change dye of the coding composition becomes substantially colorless, and therefore advantageously allows the user to form complete, continuous words, patterns, and/or images (all of which will eventually become coded information) on a substrate.

Subsequently, written marks comprising the decoding ink composition are made over and/or about the (now substantially colorless) coded information. The written marks formed over and/or about the coded information and formed from the decoding ink composition become substantially colorless almost immediately. However, the written marks comprising the decoding composition that are not made over the (now transparent) coding ink composition written marks do not become substantially colorless, but rather remain substantially colored. Thus, a reverse image of the coded information is formed by application of the decoding composition over and/or about the previously formed coded information.

A further embodiment of the disclosure provides a method of writing in code comprising forming coded information by applying a coding composition to a substrate, forming a reverse image of the coded information by applying a decoding composition about the coded information and optionally, erasing the reverse image by applying an erasing composition over the decoding composition.

Another embodiment of the disclosure provides a method of writing in code comprising forming coded information by applying a coding composition to a substrate, forming a positive image of the coded information by applying a decoding composition over the coding composition and optionally, erasing the positive image by applying an erasing composition over the decoding composition. In contrast to the other embodiments set forth above, the coding composition does not include a color-destroying agent, but does contain a color change dye and a solvent system as described herein; the decoding composition does not contain an eradicable dye, but contains a solvent as described herein and an acid or a base (most typically, a non-volatile acid or base) to restore the chromophore system of the color change dye (whether an acid or a base should be used in the decoding composition depends on the selection of the specific color change dye); and the optional erasing composition does not include a color-destroying agent, but includes a solvent as described herein and a base (if an acid is used to restore the chromophore) or an acid (if a base is used to restore the chromophore) so as to render the color change dye substantially colorless.

An additional embodiment of the disclosure provides a decoding system comprising a coding composition containing a color change dye and a solvent system comprising a solvent and either a volatile acid or a volatile base, and a decoding composition comprising a solvent system comprising a solvent (as previously) and further comprising a volatile acid (if the coding composition includes a volatile acid) or a volatile base (if the coding composition includes a volatile base). When written marks are made with the coding composition according to this embodiment (so as to form coded information), the coded information will typically disappear within about 5 seconds to about 30 seconds (often in about 10 seconds). However, when written marks comprising the decoding ink composition of this embodiment are made over and/or about the (now substantially colorless) coded information, the color of the coded information will be restored, and a positive image of the coded information will become (and remain) visible for a period of about 10 seconds. After the volatile base evaporates, the coded information will become substantially colorless. Furthermore, this embodiment requires two writing points whereas the other embodiments typically utilize three writing points (i.e., when the optional erasing writing point is incorporated into the decoder writing instrument system).

Decoder Writing Instrument Systems

A representative decoding writing instrument system is shown in FIGS. 1 and 2. FIGS. 1 and 2 illustrate a single marker that includes the coding writing point, the decoding writing point, and the optional erasing writing point. Of course, two or three separate writing instruments could alternatively be used to house the coding writing point, the decoding writing point, and the optional erasing writing point. Additionally, writing instruments including but not limited to markers, ball point pens, and/or fountain pens could be used to house the various writing points.

FIG. 1 shows a marker 10 including three separate, distinct writing points. Two writing points 12A, 12B are disposed at one end 14 of the marker 10, and the third writing point 16 is disposed at an end 18 that is generally opposite the first end 14. In the exemplary embodiment shown, the marker 10 includes a writing instrument housing 20 that is generally linear. The writing instrument housing 20, however, may have any suitable shape including but not limited to curved, angular, or bent. For example, the writing instrument housing 20 can be shaped such that the three writing points are arranged to form a triangle.

The marker 10 includes three separate reservoirs 22A, 22B, and 24. The reservoirs 22A, 22B contain ink compositions to be supplied to the writing points 12A, 12B, which project from the end 14. The third reservoir 24 contains an ink composition to be supplied to the writing point 16, which projects from the end 18. When three separate writing points 12A, 12B, and 16 are disposed in a single writing instrument 10, the reservoirs 22A, 22B, which are disposed adjacent one another, typically contain the decoding composition and erasing composition, respectively, and the other reservoir 24 contains the coding composition. The reservoirs 22A, 22B may have a larger volume than the reservoir 24 because a user is likely to apply greater quantities of the decoding and erasing compositions to a substrate (relative to the quantity of the coding composition).

In the exemplified embodiment, the writing points 12A, 12B, and 16 are provided by conventional marker nibs. Such nibs include a feedstick portion 26A, 26B, or 28, which is disposed in continuous contact with one of the reservoirs 22A, 22B, or 24 in the illustrated writing instrument 10, and a writing portion 30A, 30B, or 32 projecting from one of the ends 14 or 18.

The marker 10 also includes a partition wall 34 separating the reservoirs 22A, 22B from the third reservoir 24. The reservoirs 22A, 22B are generally retained in position in the housing 20 by virtue of a snap fit engagement between a first ferrule 36 and the housing 20. The first ferrule 36 includes channels 38A, 38B for receiving the reservoirs 22A, 22B, and for positioning the writing points 12A, 12B such that they are retained in fluid communication with the reservoirs 22A, 22B. The reservoir 24 is similarly retained in position by virtue of a snap fit engagement between a second ferrule 40 and the housing 20. The second ferrule 40 includes a channel 42 for receiving the reservoir 24, and for positioning the writing point 16 such that it is retained in fluid communication with the reservoir 24. The marker 10 also includes a first cap 44 to cover and substantially seal the writing points 12A, 12B. The marker 10 further includes a second cap 46 to cover and substantially seal the writing point 16.

The reservoirs should generally be inert to the various compositions. An example of a suitable reservoir is a melt-blown fibrous reservoir from Filtrona Company (Colonial Height, Va.). The reservoirs can be of any dimensions as long as the dimensions are sufficient for storing a predetermined amount of the coding composition, decoding composition, or the erasing composition, and allow the reservoir to fit into the desired marker or other writing instrument housing. Reservoirs for use in the markers according to the disclosure preferably have a reservoir fiber density between about 0.10 gram/cubic centimeter (g/cc) and about 0.50 g/cc. The reservoir fibers can be manufactured from thermoplastic polymers such as, for example, polyesters, nylons, polypropylenes, and mixtures thereof. The fibers inside the reservoir can be linearly-oriented or entangled. To maintain the integrity of the ink reservoir towards aggressive solvents, the reservoir can be wrapped with a sheet of polypropylene or nylon.

The nibs should allow for continual delivery of the compositions contained in the reservoirs. Fibers of the nibs should be compatible with the various solvent systems of the compositions. An exemplary nib is a polyester/urethane nib supplied by Teibow Company, Ltd. (Hamamatsu, Japan) Suitable nib fibers can be manufactured from thermoplastic polymers such as, for example, acrylics, polyesters, polypropylenes, nylons, and mixtures and copolymers thereof. The nib fibers are typically bound by a second resin, which also should be insoluble in the composition solvent system. Exemplary second resins include polyacetal and melamine.

Coding Composition

After application to a substrate, the coding composition initially is visible, but becomes substantially colorless (or substantially invisible) after a certain period of time. Preferably, this period of time is greater than about two seconds and less than about 30 seconds, greater than about five seconds and less than about twenty seconds, and/or less than about ten seconds.

The coding composition generally comprises a solvent system comprising a solvent and either a volatile acid or a volatile base, a color change dye that becomes substantially colorless upon evaporation of the solvent system, and a color-destroying agent.

Any solvent can be used, but aqueous solvents consisting essentially (i.e., more than 65 weight percent (wt. %) of the solvent system of the coding composition) of water are preferred because of their low toxicity. Of course, non-aqueous solvents may also be used. Specific solvents for use in combination with water include but are not limited to glycol, polyethylene oxide, mono-alkoxylated polyethylene oxide, di-alkoxylated polyethylene oxide, polypropylene oxide, mono-alkoxylated polypropylene oxide, di-alkoxylated polypropylene oxide, dimethylsulfoxide, dimethylformamide, dimethylacetamide, and N-methylpyrrolidone. The coding composition contains about 60 wt. % to about 99.9 wt. %, about 70 wt. % to about 95 wt. %, and/or about 65 wt. % to about 90 wt. % of the solvent.

Typically, the solvent system comprises either a volatile base or a volatile acid. Any known volatile bases or volatile acids can be used. Because the color change dye becomes substantially colorless upon evaporation of the solvent system, the volatility of the solvent system (more specifically, the volatility of the volatile base or volatile acid) is substantially related to the duration that information recorded with the coding composition remains legible or visible. The coding composition contains at least about 0.0001 wt. %, at least about 0.01 wt. %, and/or at least about 0.1 wt. % of either the volatile base or volatile acid. Furthermore, in various embodiments the coding composition contains about 0.0001 wt. % to about 20 wt. %, about 0.01 wt. % to about 15 wt. %, and/or about 0.25 wt. % to about 10 wt. % of the volatile base or volatile acid.

Exemplary volatile bases include dimethylamino-2-propanol, ammonia, and alkylamines including but not limited to propylamine, butylamine, 3,3-dimethylpropylamine, and cyclohexylamine. Other volatile basic materials may also be used. Exemplary volatile acids include but are not limited to formic acid, acetic acid, and trifluoroacetic acid. Other volatile acidic materials may also be used.

Suitable color change dyes change color pursuant to a local change in either acid concentration or base concentration, and are typically colored in the presence of either an acid or a base. The local change in either acid concentration or base concentration is generally caused by the evaporation of the coding composition solvent system (which includes either a volatile acid or a volatile base). The color change from colored to substantially colorless can result from electron transfer and/or proton transfer reactions.

The coding composition generally contains a sufficient amount of the color change dye to display color upon application of the coding composition to a substrate. In an alternative embodiment, a pigment having a suitable color change dye adsorbed thereto (as described above) can be used as the color change dye. Typically, the coding composition typically contains at least about 0.0001 wt. %, at least about 0.01 wt. %, and/or at least about 0.1 wt. % of the color change dye. Furthermore, in various embodiments the coding composition contains about 0.0001 wt. % to about 20 wt. %, about 0.01 wt. % to about 15 wt. %, and/or about 0.05 wt. % to about 5 wt. % of the color change dye. Such color change dyes include but are not limited to pH sensitive dyes such as pH indicator dyes and leuco dyes.

The color change dyes of the coding composition are typically colored under either basic or acidic conditions, and change from colored to substantially colorless according to a local change in pH that is caused by evaporation of the coding composition solvent system (including a volatile acid or a volatile base). Suitable color change dyes that are colored under basic conditions include but are not limited to phthalein-type dyes such as o-cresolphthalein, phenolphthalein, and thymolphthalein, phenol-type dyes such as m-nitrophenol and p-nitrophenol, cyanine, and bis-(2,4-dinitro-phenyl) acetic acid ethyl ester. Suitable color change dyes that are colored under acidic conditions include but are not limited to phthalide-type color-forming dyes such as diarylphthalide dyes and indolylphthalide dyes, fluoran dyes, leuco dyes such as acylleucoazine dyes and leucoauramine dyes, spiropyrane dyes, rhodaminelactam dyes, triarylmethane dyes, and chromene dyes. Suitable color change dyes that are colored under acidic conditions are commercially available under the PERGASCRIPT® trade name (Ciba-Geigy Corporation, Greensboro, N.C.) and under the COPIKEM® trade name (Hilton Davis Company, Cincinnati, Ohio). Preferred color change dyes include crystal violet lactone, malachite green lactone, PERGASCRIPT® red I-6B (a bis-indolyl phthalide dye), PERGASCRIPT® black I-2R (a diamino fluoran dye), PERGASCRIPT® I-2G (a xanthene dye), COPIKEM® 1 Blue CVL, Vermilion-DCF (Hodogaya Chemical (USA) Inc.), Red-DCF (Hodogaya Chemical (USA) Inc.), and Orange-DCF (Hodogaya Chemical (USA) Inc.).

The coding composition also contains a color-destroying agent. The color-destroying agent of the coding composition should be capable of making the decoding composition substantially colorless if the two compositions (or written marks made from same) come into contact with each other. The color-destroying agent is generally a basic nucleophilic anion associated with various salts including but not limited to sulfites, metasulfites, chlorites, and hydroxides. Typically, the counter cation is sodium, potassium, ammonium or other cations that allow substantial dissolution of this salt in the solvent of choice. If the decoding composition includes a triphenylmethine dye, the color-destroying agent is preferably a sulfite or a metasulfite. If the decoding composition includes an acid dye, the color-destroying agent is preferably a hypochlorite (e.g., CLOROX™ bleach). The coding composition contains at least about 0.001 wt. %, at least about 0.01 wt. %, and/or at least 0.1 wt. % of the color-destroying agent. Furthermore, in various embodiments the coding composition contains about 0.001 wt. % to about 20 wt. %, about 0.5 wt. % to about 15 wt. %, and/or about 1.0 wt. % to about 10 wt. % of the color-destroying agent.

The coding composition can further contain conventionally known additives including but not limited to surfactants, biocides, viscosity modifiers, and defoamers. Such additives can be added to enhance the physical properties of the coding composition. The relative concentrations of the additives can be adjusted so as to not adversely affect the other properties of the coding composition.

Decoding Composition

The decoding composition is generally used to restore, reveal, or otherwise "decode" the coded information. A reverse image of the coded information is generally formed when the decoding composition is applied over and/or about the coded information (previously formed with the coding composition). However, in some embodiments, a positive image of the coded information may be formed when the decoding composition is applied over and/or about the coded information. In most embodiments, the decoding composition generally comprises a solvent and an eradicable dye that becomes substantially colorless after contacting the color-destroying agent of the coding composition. However, the decoding composition may comprise a solvent and either an acid or a base selected to restore the chromophore of the coding composition (in the embodiments where a positive image is formed).

As in the coding composition, the solvent can be any solvent, but aqueous solvents consisting essentially of water are preferred because of their low toxicity. Of course, non-aqueous solvents may also be used. Specific solvents for use in combination with water include but are not limited to glycol, polyethylene oxide, mono-alkoxylated polyethylene oxide, di-alkoxylated polyethylene oxide, polypropylene oxide, mono-alkoxylated polypropylene oxide, di-alkoxylated polypropylene oxide, dimethylsulfoxide, dimethylformamide, dimethylacetamide, and N-methylpyrrolidone. The decoding composition contains about 60 wt. % to about 99.9 wt. %, about 70 wt. % to about 95 wt. %, and/or about 65 wt. % to about 90 wt. % of the solvent.

The eradicable dye is a dye whose color is substantially destroyed (i.e., the dye is rendered substantially colorless) after coming into contact with the color-destroying agent of the coding composition (and/or of the erasing composition described below). Alternatively, the eradicable dye can change from colored to another color (e.g., matching the color of the substrate upon which the compositions are applied).

Eradicable dyes containing a triphenylmethane moiety or a methine moiety are generally used. Examples of suitable eradicable dyes include but are not limited to Auramine O, Basic Yellow 2, Basic Yellow 11, Basic Yellow 13, Basic Yellow 21, Basic Yellow 28, Basic Yellow 29, Basic Yellow 40, Basic Yellow 49, Acid Blue 22, Acid Blue 83, Acid Blue 90, Acid Blue 93, Acid Fuchsin, Acid Green 3, Acid Green 5, Acid Green 9, Acid Magenta, Acid Roseine, Acid Rubin, Acid Violet 17, Acid Violet 19, Acid Violet 49, Alizarol Cyanin R, Aluminon, Aniline Blue Ws, Basic Blue 8, Basic Blue 15, Basic Blue 20, Basic Blue 26, Basic Fuchsin, Basic Green 4, Basic Red 9, Basic Red 13, Basic Red 14, Basic Red 15, Basic Red 29, Basic Red 46, Basic Violet 2, Basic Violet 3, Basic Violet 4, Basic Violet 14, Chrome Violet Cg, Chromoxane Cyanin R, Cotton Blue, Crystal Violet, Dahlia, Diamond Green B, Eriochrome Cyanin R, Ethyl Green, Ethyl Violet, Fast Green Fcf, Food Green 3, Gentian Violet, Helvetia Blue, Hoffman's Violet, Light Green, Lissamine Green Sf, Magenta 0, Magenta I, Magenta II, Magenta III, Malachite Green, Methyl Blue, Methyl Green, Methyl Violet, Methyl Violet 2b, Methyl Violet 10b, Mordant Blue 3, Mordant Violet 39, New Fuchsin, Night Blue, Acid Orange 10, Acid Orange 21, Pararosanilin, Primula, Rosanilin, Solochrome Cyanin R, Victoria Blue 4r, Victoria Blue B, Victoria Green B, Water Blue I, or a combination thereof. Preferably, the dye is Acid Green 3, Acid Blue 93, Acid Blue 90, Acid Violet 19, Acid Violet 17, Basic Red 13, Basic Red 14, Basic Yellow 49, or a combination thereof. The decoding composition typically contains about 0.05 wt. % to about 50 wt. %, about 0.07 wt. % to about 30 wt. %, and/or about 0.1 wt. % to about 10 wt. % of the eradicable dye.

The decoding composition can further contain additives including but not limited to surfactants, biocides, viscosity modifiers, and defoamers. Such additives can be added to enhance the physical properties of the decoding composition. The relative concentrations of the additives can be adjusted so as to not adversely affect the other properties of the decoding composition.

Erasing Composition

The erasing composition is an optional component, and is used to permanently erase the coded information. The erasing composition generally comprises a solvent and a color-destroying agent. As in the coding composition, the color-destroying agent should be capable of making the decoding composition substantially colorless if the two compositions (or written marks made from same) come into contact with each other.

As in the other ink compositions, the solvent can be any solvent, but aqueous solvents consisting essentially of water are preferred because of their low toxicity. Of course, non-aqueous solvents may also be used. Solvents for use in combination with water include but are not limited to glycol, polyethylene oxide, mono-alkoxylated polyethylene oxide, di-alkoxylated polyethylene oxide, polypropylene oxide, mono-alkoxylated polypropylene oxide, di-alkoxylated polypropylene oxide, dimethylsulfoxide, dimethylformamide, dimethylacetamide, and N-methylpyrrolidone. The erasing composition contains about 60 wt. % to about 99.9 wt. %, about 70 wt. % to about 95 wt. %, and/or about 65 wt. % to about 90 wt. % of the solvent.

The erasing composition also contains a color-destroying agent. The color-destroying agent of the erasing composition, like the color-destroying agent of the coding composition, should be capable of making the eradicable dye of the decoding composition substantially colorless if the decoding and erasing compositions (or written marks made from same) come into contact with each other. The color-destroying agent is generally a basic nucleophilic anion associated with various salts including but not limited to sulfites, metasulfites, chlorites, and hydroxides. Typically, the counter cation is sodium, potassium, ammonium or other cations that allow substantial dissolution of this salt in the solvent of choice. If the decoding composition includes a triphenylmethine dye, the color-destroying agent is preferably a sulfite or a meta-sulfite. If the decoding composition includes an acid dye, the color-destroying agent is preferably a chlorite (e.g., a clorox type bleach). The erasing composition contains at least about 0.01 wt. %, at least about 0.1 wt. %, and/or at least about 1 wt. % of the color-destroying agent. The erasing composition contains about 0.01 wt. % to about 20 wt. %, about 0.5 wt. % to about 15 wt. %, and/or about 1.0 wt. % to about 10 wt. % of the color-destroying agent.

To stabilize the basic nucleophilic anion of the color-destroying agent, stabilizers including but not limited to ethylenediaminetetraacetic acid (usually in form of a sodium salt) is added. The loading of such stabilizer typically is between about 0.1 wt. % and about 30 wt. % of the total formulation.

Finally, to prevent subsequent reformation of the eradicable dye chromophore by reduction, other additives including but not limited to reduction stabilization agents such as urea may be added. Reduction stabilization agents are typically contained in an amount less than about 10 wt. % of the total formulation. Furthermore, in various embodiments the erasing composition contains about 0.01 wt. % to about 10 wt. % of the reduction stabilization agent.

The erasing composition can further contain additives including but not limited to surfactants, biocides, viscosity modifiers, and defoamers. Such additives can be added in amounts that enhance certain physical properties without adversely affecting other desirable physical properties of the erasing composition.

Decoder systems in accordance with the disclosure can be better understood in light of the following example, which is merely illustrative of the decoder systems in accordance with the disclosure, and thus is not meant to limit the scope of the appended claims in any way.

EXAMPLE

A decoder system was made in accordance with the following table. The decoder system of this example was incorporated into various markers. Typically, each marker included a coding writing point in fluid communication with a coding composition, a decoding writing point in fluid communication with a decoding composition, and an erasing writing point in fluid communication with an erasing composition in a single marker housing.

The coding composition, the decoding composition, and the erasing composition were prepared by carefully weighing the components identified in the following table, adding them to a container of the appropriate size, and mixing so as to form homogeneous solutions. The coding composition, the decoding composition, and the erasing composition were subsequently injected into three different ink reservoirs using a syringe. The reservoirs were then inserted into a marker barrel, and appropriate nibs were positioned in fluid communication with the ink reservoirs such that the writing point of the nibs projected from an end of the marker and the feedstick portion of the nibs was in continuous contact with one of the reservoirs.

Written marks made with the writing point including the writing composition of the table were initially colored (red), and became substantially colorless within about 10 to about 20 seconds so as to form coded information. Written marks made with the decoding composition of the table that were formed over and/or about the coded information became substantially colorless almost immediately (i.e., typically within one second) after coming into contact with the coded information. However, written marks made with the decoding composition that were not formed substantially over the coded information remained colored (blue). Thus, a reverse image of the coded information was formed. Subsequently, written marks made with the erasing composition were formed over and about the colored marks that provided the reverse image. The written marks made with the erasing composition which were formed substantially over the colored marks erased the colored marks, thereby erasing the reverse image.

TABLE

| Chemical Component | Function | Coding Composition Weight % | Decoding Composition Weight % | Erasing Composition Weight % |
| --- | --- | --- | --- | --- |
| Sodium Sulfite | Color-destroying agent | 6.50 | — | 3.00 |
| Water | Solvent | 73.75 | 88.00 | 84.00 |
| Urea | Reduction stabilization agent | 2.50 | — | — |
| Dow 65 | Surfactant | 0.50 | — | — |
| 0.1 N EDTA solution | Stabilizer | 13.00 | — | 13.00 |
| Potassium Carbonate | Base | 0.65 | — | — |
| o-cresol-phthalein | Color change dye | 0.10 | — | — |
| dimethylamino-2-propanol | Volatile base | 3.00 | — | — |
| Acid Blue 93 | Eradicable Dye | — | 2.00 | — |
| Propylene Glycol | Solvent (humectant) | — | 10.00 | — |
| Total | | 100.00 | 100.00 | 100.00 |

Although the foregoing text is a detailed description of numerous different embodiments of a decoder system, the detailed description is to be construed as exemplary only and does not describe every possible embodiment of a decoder system in accordance with the disclosure.

What is claimed is:

1. A decoder system, comprising:
   a coding composition comprising a solvent system including a first solvent and either a volatile acid or a volatile base, a color change dye capable of becoming substantially colorless upon evaporation of the solvent system, and a first color-destroying agent;
   a decoding composition comprising a second solvent and an eradicable dye capable of becoming substantially colorless when contacted with the color-destroying agent; and,
   an erasing composition comprising a third solvent and a second color-destroying agent.

2. The decoder system according to claim 1, wherein the coding composition solvent system comprises a volatile base.

3. The decoder system according to claim 2, wherein the volatile base is selected from the group consisting of dimethylamino-2-propanol, ammonia, and alkylamines.

4. The decoder system according to claim 2, wherein the color change dye is selected from the group consisting of phthalein-type dyes, phenol-type dyes, cyanine, and bis-(2,4-dinitro-phenyl)acetic acid ethyl ester.

5. The decoder system according to claim 1, wherein the coding composition solvent system comprises a volatile acid.

6. The decoder system according to claim 5, wherein the volatile acid is selected from the group consisting of formic acid, acetic acid, and trifluoroacetic acid.

7. The decoder system according to claim 5, wherein the color change dye is selected from the group consisting of phthalide-type color-forming dyes, fluoran dyes, leuco dyes, spiropyrane dyes, rhodaminelactam dyes, triarylmethane dyes, and chromene dyes.

8. The decoder system according to claim 1, wherein the eradicable dye comprises a triphenylmethane moiety or a methine moiety.

9. The decoder system according to claim 1, wherein the eradicable dye is selected from the group consisting of Auramine O, Basic Yellow 2, Basic Yellow 11, Basic Yellow 13, Basic Yellow 21, Basic Yellow 28, Basic Yellow 29, Basic Yellow 40, Basic Yellow 49, Acid Blue 22, Acid Blue 83, Acid Blue 90, Acid Blue 93, Acid Fuchsin, Acid Green 3, Acid Green 5, Acid Green 9, Acid Magenta, Acid Roseine, Acid Rubin, Acid Violet 17, Acid Violet 19, Acid Violet 49, Alizarol Cyanin R, Aluminon, Aniline Blue Ws, Basic Blue 8, Basic Blue 15, Basic Blue 20, Basic Blue 26, Basic Fuchsin, Basic Green 4, Basic Red 9, Basic Red 13, Basic Red 14, Basic Red 15, Basic Red 29, Basic Red 46, Basic Violet 2, Basic Violet 3, Basic Violet 4, Basic Violet 14, Chrome Violet Cg, Chromoxane Cyanin R, Cotton Blue, Crystal Violet, Dahlia, Diamond Green B, Eriochrome Cyanin R, Ethyl Green, Ethyl Violet, Fast Green Fcf, Food Green 3, Gentian Violet, Helvetia Blue, Hoffman's Violet, Light Green, Lissamine Green Sf, Magenta 0, Magenta I, Magenta II, Magenta III, Malachite Green, Methyl Blue, Methyl Green, Methyl Violet, Methyl Violet 2b, Methyl Violet 10b, Mordant Blue 3, Mordant Violet 39, New Fuchsin, Night Blue, Acid Orange 10, Acid Orange 21, Pararosanilin, Primula, Rosanilin, Solochrome Cyanin R, Victoria Blue 4r, Victoria Blue B, Victoria Green B, and Water Blue I.

10. The decoder system according to claim 1, wherein the color-destroying agent is a basic nucleophilic anion.

11. The decoder system according to claim 10, wherein the basic nucleophilic anion is selected from the group consisting of sulfites, metasulfites, chlorites, and hydroxides.

12. A decoder writing instrument system, comprising:
a coding writing point in fluid communication with a coding composition comprising a solvent system including a first solvent and either a volatile acid or a volatile base, a color change dye capable of becoming substantially colorless upon evaporation of the solvent system, and a first color-destroying agent;
a decoding writing point in fluid communication with a decoding composition comprising a second solvent and an eradicable dye capable of becoming substantially colorless when contacted with the color-destroying agent, and,
an erasing writing point in fluid communication with an erasing composition comprising a third solvent and a second color-destroying agent.

13. The decoder writing instrument system according to claim 12, wherein the coding writing point, the decoding writing point, and the erasing writing point are disposed in a single writing instrument.

14. A method of writing in code, comprising:
forming coded information by applying a coding composition comprising a solvent system including a solvent and either a volatile acid or a volatile base, a color change dye capable of becoming substantially colorless upon evaporation of the solvent system, and a color-destroying agent to a substrate; and,
forming either a reverse image or a positive image of the coded information by applying a decoding composition about the coded information.

15. The method of writing in code according to claim 14, further comprising erasing the reverse image or positive image by applying an erasing composition over the decoding composition.

16. A method of writing in code, comprising:
forming coded information by applying a coding composition to a substrate, wherein the coding composition comprises a colorant capable of becoming substantially colorless after application and a color-destroying agent;
revealing the coded information by applying a decoding composition about the coded information, wherein the decoding composition contains either a pH-adjusting component in an amount capable of restoring the color of the colorant or an eradicable dye capable of reacting with the color-destroying agent of the coding composition so as to render the eradicable dye substantially colorless.

17. The method of writing in code according to claim 16, further comprising erasing the coded information.

18. A decoder system, comprising:
an initially-colored coding writing composition containing a colorant capable of becoming substantially colorless and a first color-destroying agent;
a decoding writing composition containing either a pH-adjusting component in an amount capable of restoring the color of the colorant or an eradicable dye capable of reacting with the first color-destroying agent of the coding writing composition so as to render the eradicable dye substantially colorless; and,
an erasing writing composition containing a second color-destroying agent capable of rendering the eradicable dye of the decoding writing composition substantially colorless.

* * * * *